United States Patent
Salgueiro et al.

(10) Patent No.: US 10,075,232 B1
(45) Date of Patent: Sep. 11, 2018

(54) DETECTING FIBER OPTIC BREAKS USING AUTONOMOUS VEHICLES

(71) Applicant: Cisco Technology, Inc., San Jose, CA (US)

(72) Inventors: Gonzalo Salgueiro, Raleigh, NC (US); Vinit Jain, Morrisville, NC (US); Joseph Michael Clarke, Raleigh, NC (US); Charles Calvin Byers, Wheaton, IL (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/490,288

(22) Filed: Apr. 18, 2017

(51) Int. Cl.
*H04B 10/08* (2006.01)
*H04B 10/071* (2013.01)
*H04L 29/08* (2006.01)
*B64C 39/02* (2006.01)

(52) U.S. Cl.
CPC ......... *H04B 10/071* (2013.01); *B64C 39/024* (2013.01); *H04L 67/12* (2013.01); *B64C 2201/12* (2013.01); *B64C 2201/141* (2013.01)

(58) Field of Classification Search
CPC .. H04B 10/071; H04B 10/073; H04B 10/075; H04B 10/0771; H04B 10/0777; H04B 10/0795; H04B 10/0791; H04B 10/07955; G01M 11/3136; G01M 11/3145; G01M 11/3154
USPC ........ 398/16, 20, 21, 33, 38, 10, 13, 17, 31, 398/32, 30, 25, 26, 27, 22, 23, 24; 356/73.1
See application file for complete search history.

(56) References Cited

U.S. PATENT DOCUMENTS

| 7,484,899 | B2 | 2/2009 | Chan et al. | |
|---|---|---|---|---|
| 8,073,294 | B2 | 12/2011 | Huffman et al. | |
| 9,036,991 | B2 | 5/2015 | Aguren | |
| 9,042,723 | B2 * | 5/2015 | Dahlfort | H04B 10/071 398/10 |
| 2008/0031624 | A1 * | 2/2008 | Smith | H04B 10/071 398/71 |

FOREIGN PATENT DOCUMENTS

| CN | 103634046 A | 3/2014 |
|---|---|---|
| CN | 103647601 A | 3/2014 |

OTHER PUBLICATIONS

"Synchronous optical networking", https://en.wikipedia.org/wiki/Synchronous_optical_networking, Dec. 9, 2016, 6 pages, Wikimedia Foundation, Inc.

(Continued)

*Primary Examiner* — Hanh Phan
(74) *Attorney, Agent, or Firm* — Parker Ibrahim & Berg LLP; James M. Behmke; Stephen D. LeBarron (57) ABSTRACT

In one embodiment, an autonomous vehicle receives a location of a fiber optic cable repeater of a fiber optic cable. The autonomous vehicle navigates the vehicle to the location of the fiber optic cable repeater and interfaces an optical time domain reflectometer (OTDR) of the autonomous vehicle with an OTDR port of the fiber optic cable repeater. The autonomous vehicle performs OTDR measuring of the fiber optic cable via the OTDR port of the fiber optic cable repeater, and sends a result of the OTDR measuring of the fiber optic cable to a supervisory device.

20 Claims, 8 Drawing Sheets

(56) References Cited

OTHER PUBLICATIONS

"Time-domain reflectometer",https://en.wikipedia.org/wiki/Time-domain_reflectometer, Nov. 2, 2016, 4 pages, Wikimedia Foundation, Inc.

OTDR | Submarine Cable Deployment | Fiber Monitoring | Blog; The Benefits of Remotely Operated OTDRs for Submarine Cable Deployment, Fiber Monitoring and Restoration; http://www.exfo.com/corporate/blog/2011/submarine-cable-deployment- . . . ; pages 1-5.

Norman Elsasser; Locating Breaks in Fiber-Optic Networks; http://www.cablinginstall.com/articles/print/volume-3/issue-1/cable-instal . . . ; Jan. 1, 1995; page 1.

\* cited by examiner

DETECTING FIBER OPTIC BREAKS USING AUTONOMOUS VEHICLES

TECHNICAL FIELD

The present disclosure relates generally to computer networks, and, more particularly, to detecting fiber optic breaks using autonomous vehicles.

BACKGROUND

Many data providers use fiber optic cables for high bandwidth transmissions, including telephone signals, Internet communications, and cable television signals. Fiber optics can carry data over very long distances with less interference. An optical signal is created by a transmitter, and the signal is relayed along the cable by repeaters to ensure that the signal does not become distorted or weak. Deployment of fiber cables can also vary considerably, with many long distance deployments spanning remote and hard to reach locations, such as underground or underwater cables. Breaks in the optical fibers may occur over the long cable spans between repeaters, which can disrupt transmissions and cause significant data loss.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, an autonomous vehicle receives a location of a fiber optic cable repeater of a fiber optic cable. The autonomous vehicle navigates the vehicle to the location of the fiber optic cable repeater and interfaces an optical time domain reflectometer (OTDR) of the autonomous vehicle with an OTDR port of the fiber optic cable repeater. The autonomous vehicle performs OTDR measuring of the fiber optic cable via the OTDR port of the fiber optic cable repeater, and sends a result of the OTDR measuring of the fiber optic cable to a supervisory device.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or PLC networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services, including computation, networking, and storage, to the local nodes in the network, in contrast to cloud-based approaches that rely on remote data centers/cloud environments for the services. To this end, a fog node is a functional node that is deployed close to fog endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration. Fiber optical connections, as described above are often used to interconnect the distributed fog nodes.

Figure 1:
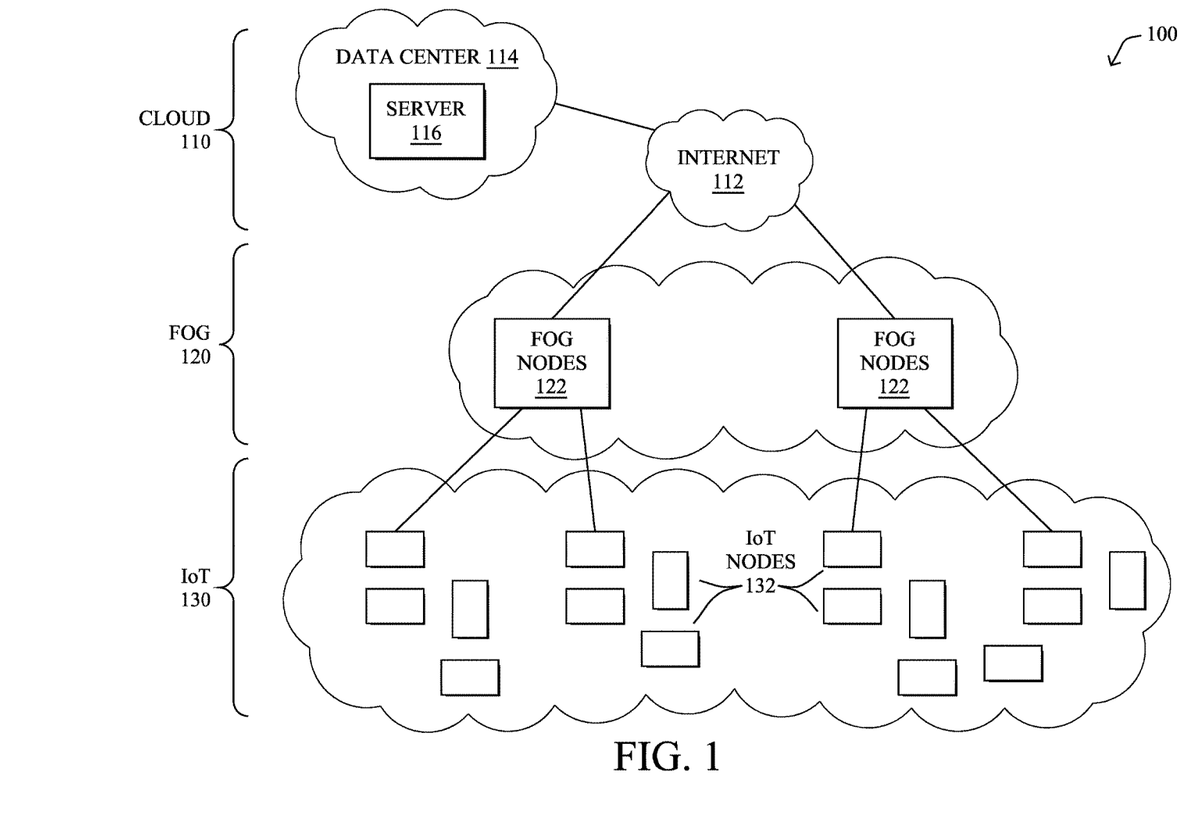
FIG. 1 illustrates an example communication network.

FIG. 1 is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely the cloud 110, fog 120, and IoT device 130. Illustratively, the cloud 110 may comprise general connectivity via the Internet 112, and may contain one or more datacenters 114 with one or more centralized servers 116 or other devices, as will be appreciated by those skilled in the art. Within the fog layer 120, various fog nodes/devices 122 (e.g., with fog modules, described below) may execute various fog computing resources on network edge devices, as opposed to datacenter/cloud-based servers or on the endpoint nodes 132 themselves of the IoT layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Figure 2:
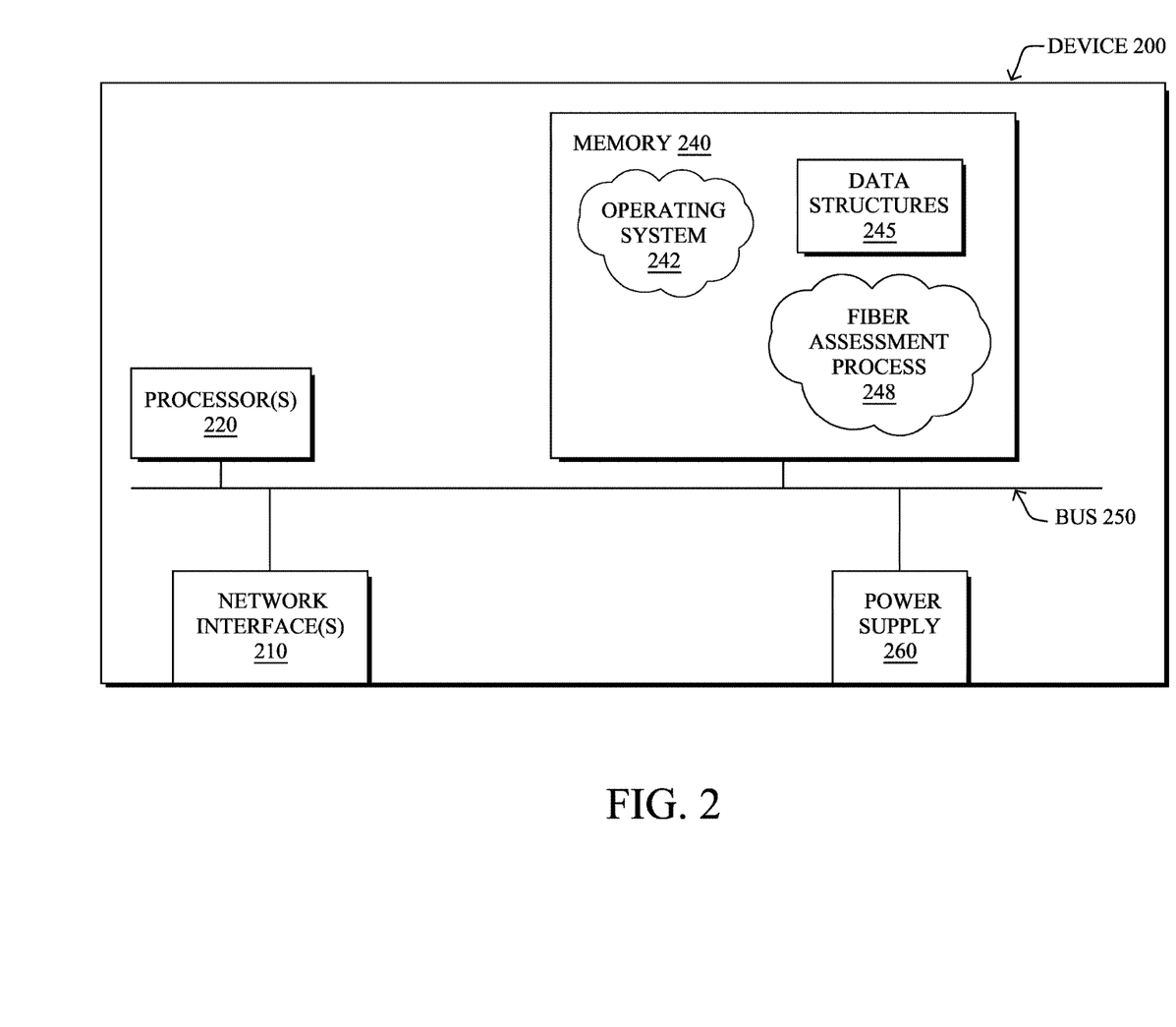
FIG. 2 illustrates an example network device/node.

FIG. 2 is a schematic block diagram of an example computing device/node 200 that may be used with one or more embodiments described herein e.g., as any of the devices shown in FIG. 1 above or any of the devices described further below. The device may comprise one or more network interfaces 210 (e.g., wired, wireless, cellular, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100. The network interfaces may be configured to transmit and/or receive data using a variety of different communication protocols. Note, further, that the nodes may have two or more different types of network connections 210, e.g., wireless and wired/physical connections, and that the view herein is merely for illustration. Also, while the network interface 210 is shown separately from power supply 260, for PLC communications, the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise an illustrative fiber assessment process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

As noted above, many service providers lay optical fibers to provide connectivity between different locations, particularly across long distances. Any fiber cut or broken may significantly impact the communication traffic, and determining the location of a break is complex and difficult, especially if they occur in inaccessible underground locations or under deep sea water. Troubleshooting and fixing a fiber break, requiring the identification of the appropriate span between repeaters in a multi-span network, is often tedious and time consuming since repeaters may be spaced far apart (such as at a distance of nearly 80 km in modern networks) and may be located in remote and hard to reach locations. Breaks in a cable can be detected with an optical time domain reflectometer (OTDR), but high accuracy OTDRs are expensive, physically large, and consume significant power, and, therefore, are typically not permanently installed adjacent to each span of a fiber optic network.

Detecting Fiber Breaks Using Autonomous Vehicles

The techniques herein include the use of autonomous vehicles, such as unmanned aerial vehicles (UAVs) or unmanned underwater vehicles (UUVs), to proactively monitor the integrity of fiber optic cable. In some embodiments, the vehicle may be enabled to determine the specific location of a break along a fiber optic cable and, further, may identify and specifically indicate the break location. For an underground cable in particular, this may minimize the effort and space required to dig the ground and repair the broken fiber. In some embodiments, the vehicle may also be configured to repair a broken optical cable fiber.

Specifically, according to one or more embodiments of the disclosure as described in detail below, an autonomous vehicle receives a location of a fiber optic cable repeater of a fiber optic cable. The autonomous vehicle navigates the vehicle to the location of the fiber optic cable repeater and interfaces an optical time domain reflectometer (OTDR) of the autonomous vehicle with an OTDR port of the fiber optic cable repeater. The autonomous vehicle performs OTDR measuring of the fiber optic cable via the OTDR port of the fiber optic cable repeater, and sends a result of the OTDR measuring of the fiber optic cable to a supervisory device.

Illustratively, the techniques described herein may be performed by hardware, software, and/or firmware, such as in accordance with the fiber assessment process 248, which may include computer executable instructions executed by the processor 220 (or independent processor of interfaces 210) to perform functions relating to the techniques described herein.

Figure 3A:
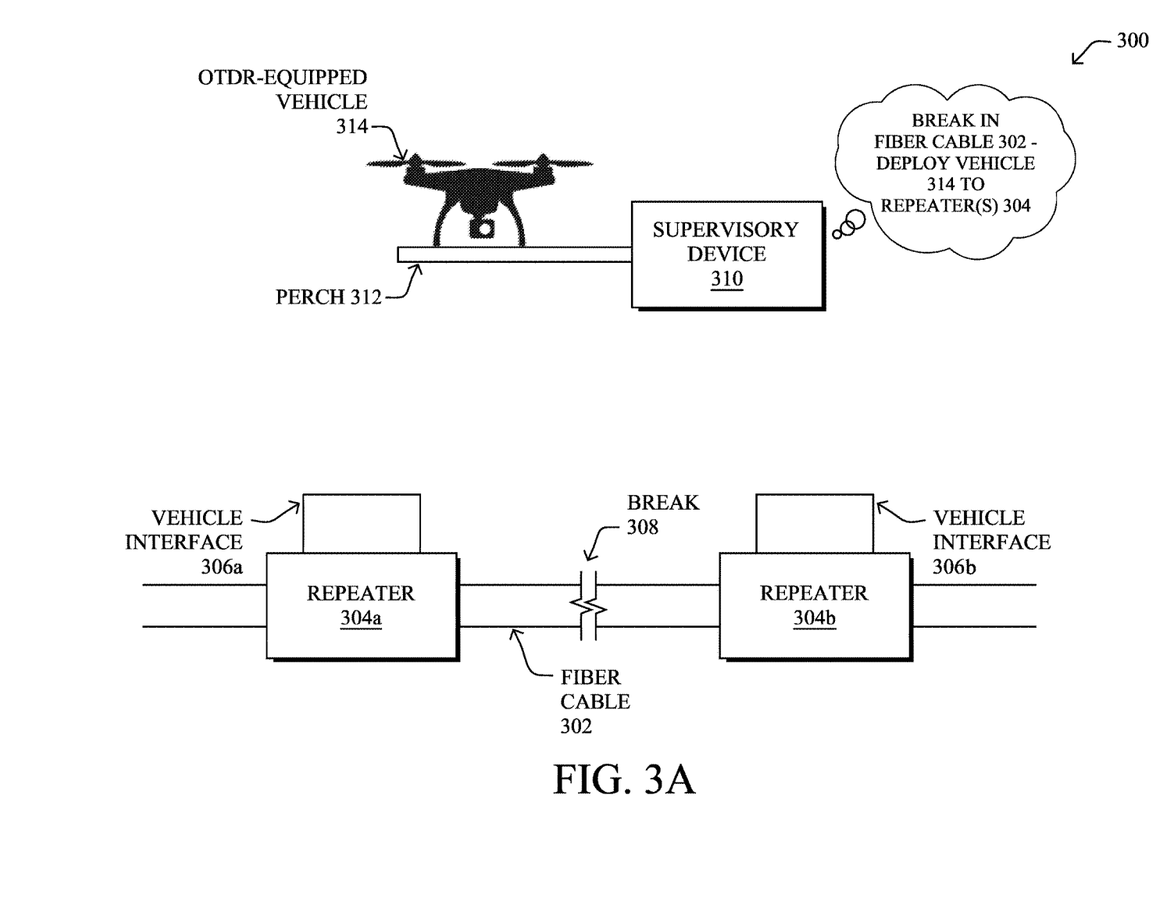
FIGS. 3A-3D illustrate an example of the assessment of a fiber cable.

Operationally, FIGS. 3A-3D illustrate an example assessment of a fiber cable, such as a fiber optic cable. As shown in FIG. 3A, an autonomous vehicle, which may be any driverless vehicle capable of self-propulsion and navigation, receives instructions regarding a potential break in a fiber cable. In some embodiments, the vehicle is an unmanned aerial vehicle (UAV) or an unmanned underwater vehicle (UUV). In other embodiments, the vehicle may be partially or fully-remote controlled, as opposed to autonomous.

As shown in FIG. 3A, autonomous vehicle 314 may be a UAV equipped with an optical time domain reflectometer (OTDR), which may be used to characterize and determine discontinuities in an optical fiber by injecting a series of optical pulses into the fiber under test and measuring, from the same end of the fiber, the light that is scattered or reflected back from points along the fiber. In this way, discontinuities along the fiber may be analyzed, both those that are expected (e.g., connectors, fiber ends, splices, etc.) and those unexpected (e.g., a break point or other regions of damage to the fiber optic cable).

An OTDR is an optical test instrument that works by injecting brief pulses of optical energy into one end of a fiber or other optical system, and observing the intensity and timing of any reflected pulses. These reflections can be used to estimate the severity of and distance to any discontinuity in the optical path, such as a fiber break.

Instructions may be received by autonomous vehicle 314 from various sources, including from a supervisory device in a network or via user input. The supervisory device may be a fog computing device/node or a server (e.g., a cloud-based server or service, etc.) or may be in communication therewith. For example, as shown in FIG. 3A, autonomous vehicle 314 may receive instructions from supervisory device 310 in network 300. The supervisory device may include perch 312 from which autonomous vehicle 314 may be deployed and on which it may land to be sheltered, secured, recharged, tested, and calibrated. The received instructions may include at least one location of a fiber optic cable repeater of a fiber optic cable (e.g., repeater(s) 304 of fiber cable 302), particularly a repeater believed to be in the vicinity of or adjacent to a span of cable including a potential cable break (e.g., repeaters 304a and 304b adjacent to break 308). For example, supervisory device 310 may upload coordinates of one or more repeaters 304 along the cable to autonomous vehicle 314. Each of the identified repeaters may include vehicle interface(s) 306, which are described in more detail below.

Figure 3B:
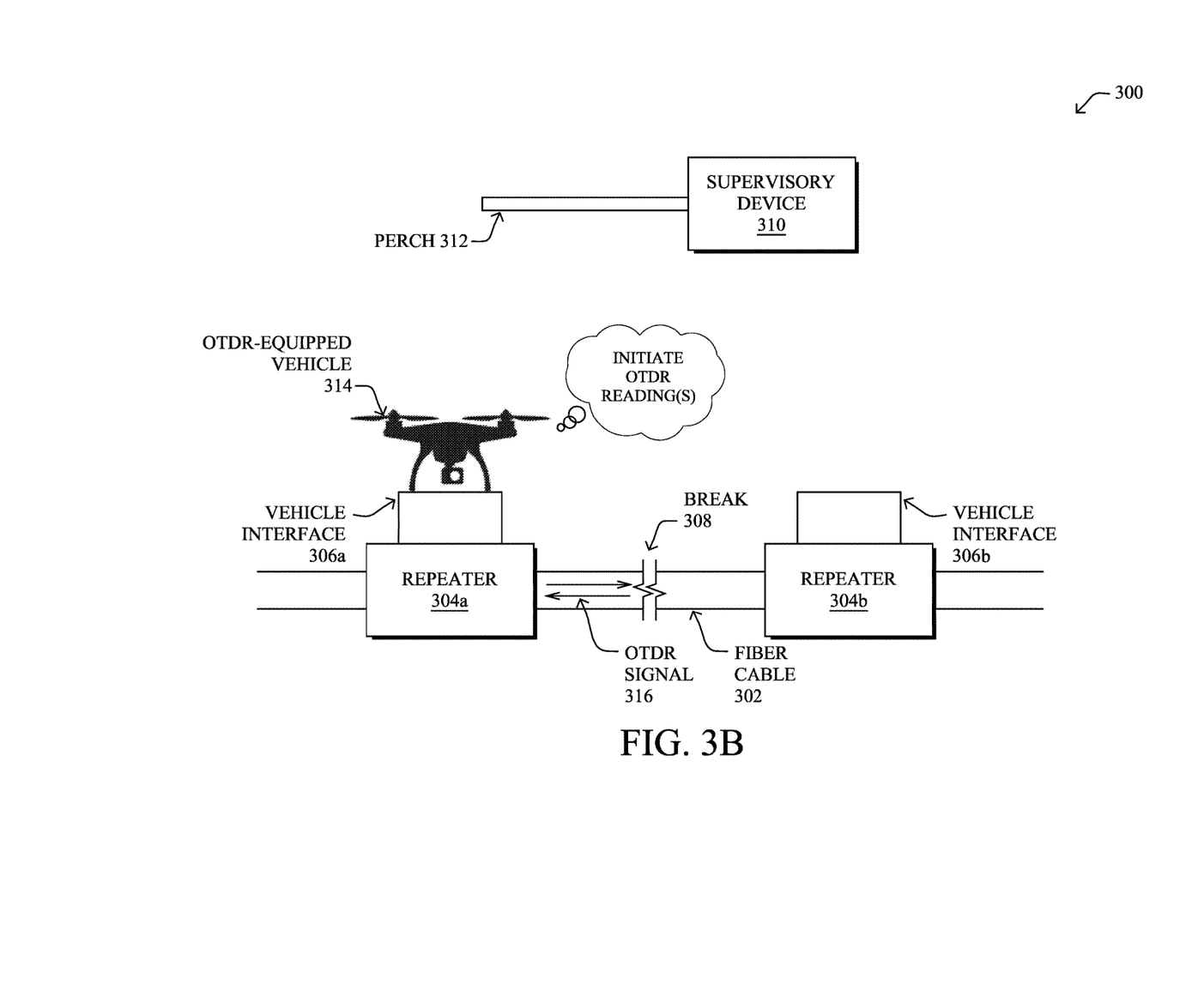

As shown in FIG. 3B, in some embodiments, the autonomous vehicle may navigate to one of the received repeater locations. For example, autonomous vehicle 314 may be deployed, such as from perch 312 of supervisory device 310, or a perch in communication with supervisory device 310, to repeater 304a of fiber cable 302, believed to be at an end of a span of cable possibly containing a break. In other embodiments, the approximate span of cable 302 may not be known and autonomous vehicle 314 may be instructed to sequentially test cable 302 via repeaters 304. Vehicle 314 may, in some embodiments, receive multiple repeater locations, such as the location of repeater 304a and 304b, and the choice of deployment may be made by the vehicle depending, for example, on which repeater is closer (e.g., shortest flight time) and/or which repeater is more readily accessible. A higher precision location of break 308 may be achieved in some embodiments by performing tests at both ends of a suspected broken fiber at repeater 304a and 304b, and correlating the results via supervisory device 310.

Figure 3C:
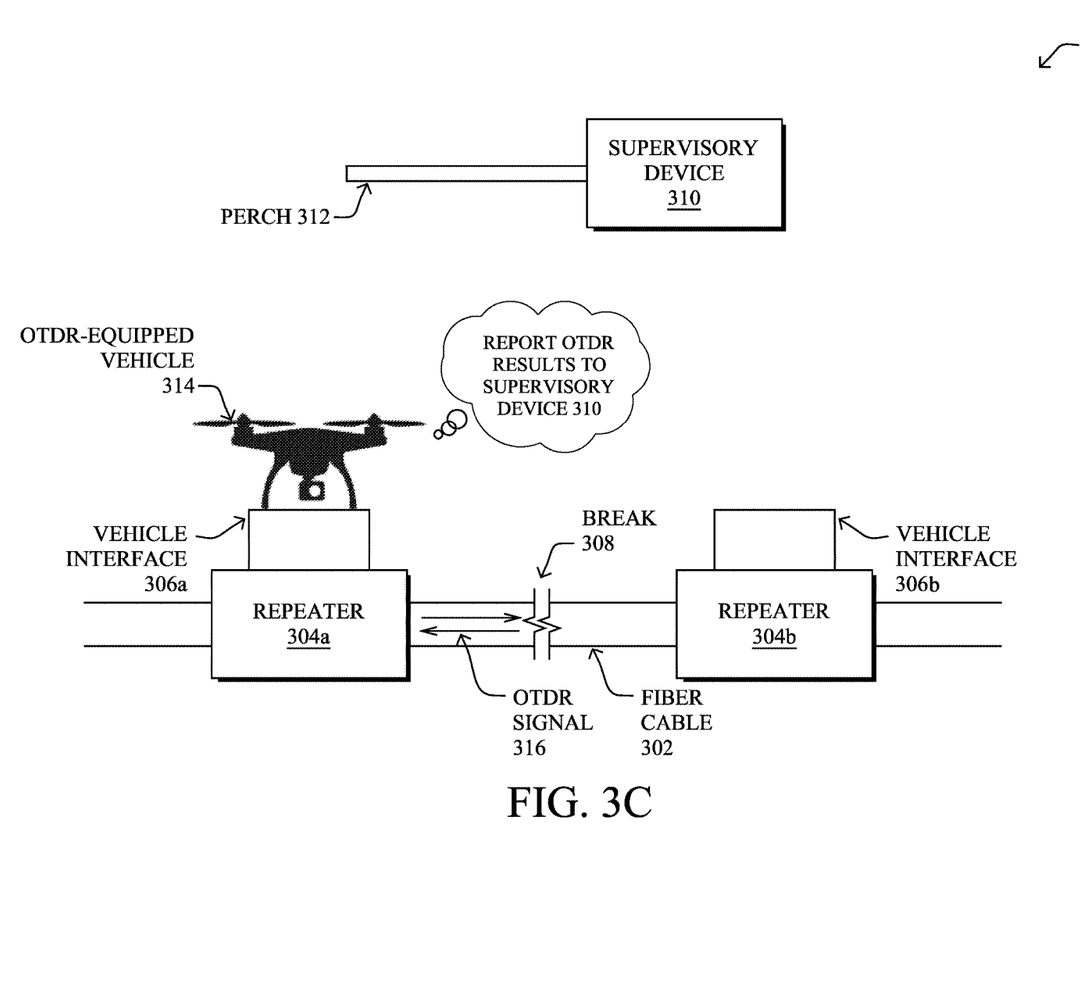

The autonomous vehicle may, in some embodiments, interface with the fiber optic cable repeater upon arrival at the chosen location in order to perform measurements and/or analysis of the fiber optic cable. For example, as shown in FIG. 3C, autonomous vehicle 314 may interface its OTDR with vehicle interface 306a of repeater 304a and may perform an OTDR measuring of the cable. In particular, a signal (e.g., OTDR signal 316) may be sent by the onboard OTDR from repeater 304a along fiber cable 302, and any reflected/scattered return signal may be received at the vehicle for further analysis in order to, for example, assess the cable quality and determine/confirm the presence of a discontinuity.

As also shown in FIG. 3C, results of the OTDR measuring may then be communicated by autonomous vehicle 314, such as to supervisory device 310. In some embodiments, autonomous vehicle 314 may communicate the results of the OTDR measuring to supervisory device 310. In turn, supervisory device 310 may issue an alert, such as to a technician for deployment to the location of the break. In some embodiments, autonomous vehicle 314 may communicate the results wirelessly to supervisory device 310 while still in the field. In other embodiments, such as when repeater 304a is located in a remote location with little or no wireless signal, autonomous vehicle 314 may instead navigate back to supervisory device 310 and upload the result directly.

The results of the OTDR measuring may include, for example, the measured return signal strength data and/or information derived from the return signal, such as signal strength integrated over time, signal strength as a function of cable length, or determination of the location of a discontinuity (e.g., break 308). For example, the autonomous vehicle may determine whether, and potentially where, a break exists in the fiber optic cable based on the OTDR measurements, and the results provided to the supervisory device may include some type of indication of the break location (e.g., GPS coordinates, cable distance from the repeater, etc.). In some embodiments, the raw OTDR measurement data may be sent to the supervisory device for determination or confirmation of the location of a potential break, and supervisory device 310 may send the location back to autonomous vehicle 314.

Figure 3D:
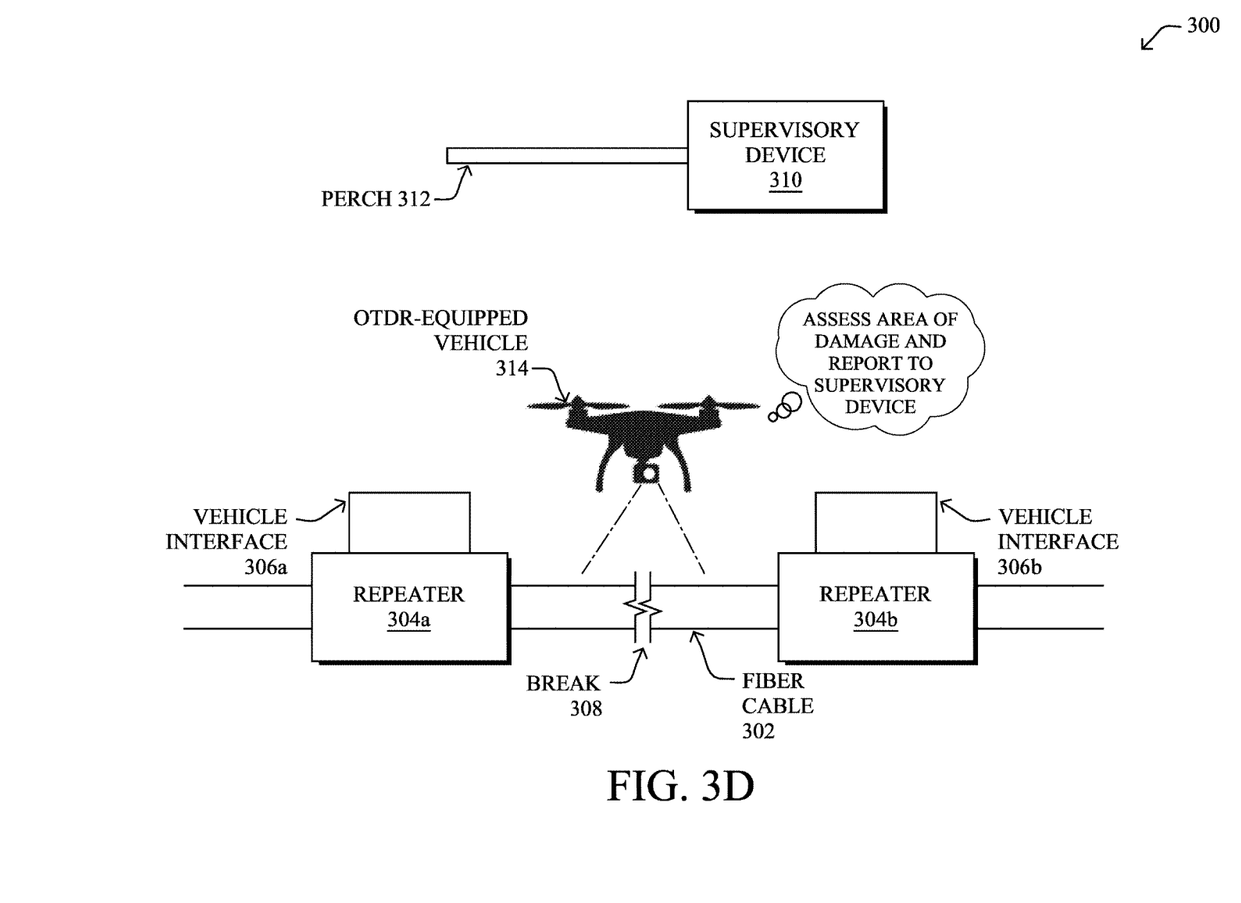

As shown in FIG. 3D, in some embodiments, the vehicle may further assess the area of the cable indicated by the results of the OTDR measuring as a potential break in the cable fiber. For example, autonomous vehicle 314 may navigate to or near the determined location of possible interest and may generate a marking or other indication of the location. This indication may be visible, such as a beam of light emitted by the vehicle (e.g., a laser image or spotlight) onto the specific location, and/or may be recorded, such as by taking and capturing an image or video of the location. In the case of an image or video, autonomous vehicle 314 may provide this data back to supervisory device 310, thereby assisting a technician or other autonomous repair vehicle in deploying to the location of the break. By indicating the position and location of a potential break, repair work can be more focused, minimizing excessive and unnecessary work, and improving the work efficiency and time for completing the repair.

Figure 4:
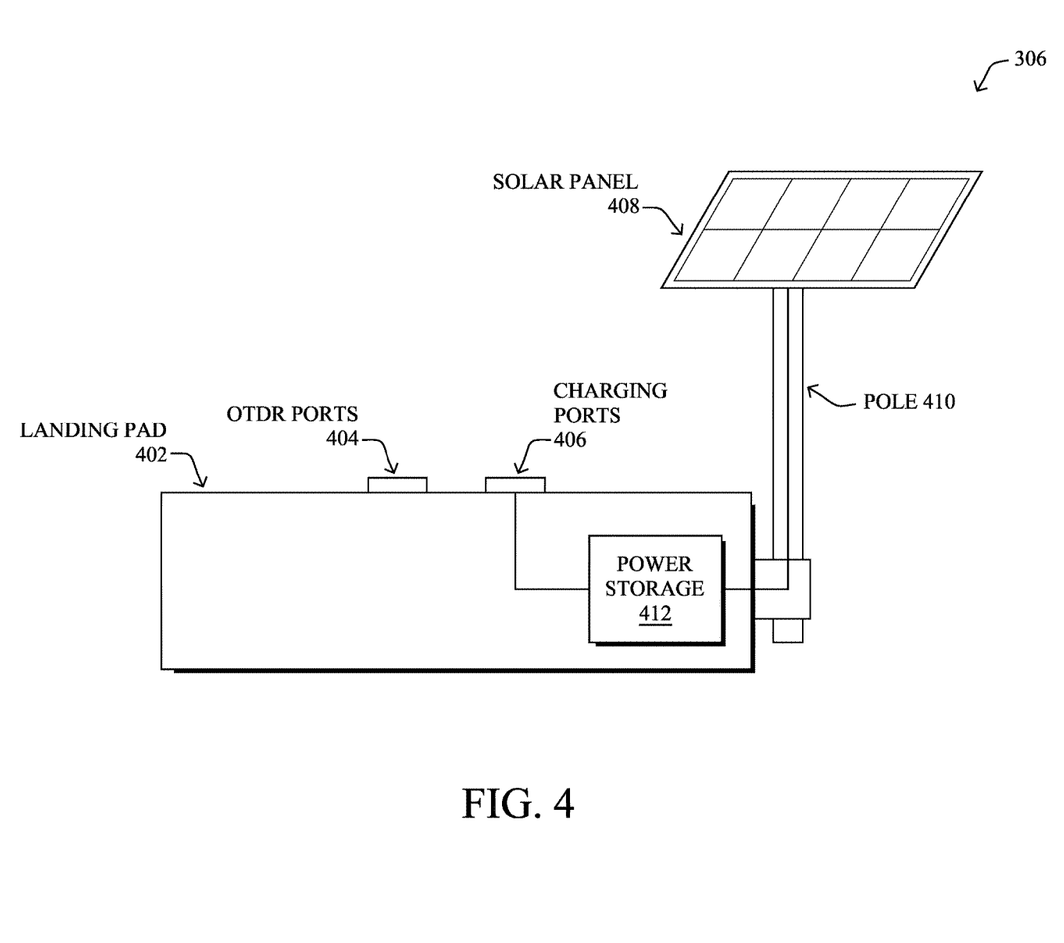
FIG. 4 illustrates an example vehicle interface.

As discussed above, the autonomous vehicle 314 may navigate to a specified fiber optic cable repeater location in the vicinity of a potential break and may interface with a repeater to perform OTDR measuring of the cable. FIG. 4 shows an embodiment of a vehicle interface 306 of a fiber optic cable repeater that may be used in the techniques described herein. As shown in FIG. 4, vehicle interface 306 of a repeater 304 may include a landing zone on which the autonomous vehicle may safely land and dock (e.g., landing pad 402). In other cases, autonomous vehicle 314 may instead interface with a repeater 304 without landing and/or docking with the repeater.

In addition, the vehicle interface 306 may further include OTDR port 404 with which the OTDR of the autonomous vehicle may interface and perform OTDR measuring. For example, in general, fiber optic cables include connectors that connect the fibers from the repeater directly to the long distance transport fibers. In some embodiments, the autonomous vehicle (e.g. UAV or UUV) may insert a probe into this connector through port 404 to divert optical signals to the vehicle OTDR (e.g., using a robotic actuator of the vehicle). When the probe is inserted, the fiber signals that normally pass between the optical interfaces of the repeater and the long distance fibers are interrupted, and the signals are diverted into the autonomous vehicle's OTDR. In this way, the autonomous vehicle may test the input and output ports of nearby repeaters and also use its OTDR to get high resolution readings on the long distance fibers. Based on the results of the OTDR measurements at various repeaters, the autonomous vehicle may determine, with or without the assistance of a supervisory device, the location of the repeater that is closest to the potential break, which is used to more precisely determine the break location. When autonomous vehicle disconnects from OTDR ports 404, the fiber connections are reestablished between the repeater's optical interfaces and the long distance fibers.

The vehicle interface may further include a source of power for the autonomous vehicle, in some embodiments. For example, vehicle interface 306 may include one or more charging ports 406 from which a vehicle on landing pad 402 may receive power, such as during OTDR measuring or prior to deployment back to its home base. The charging ports may include a variety of different power sources, appropriate for the location of the repeater. For example, as shown in FIG. 4, charging ports 406 may be powered by solar panel 408 raised on pole 410 or otherwise supported on or near vehicle interface 306. Power from solar panel 408 may be provided to power storage 412 at or near the vehicle interface to be available at the charging port for the docked vehicle. Other forms of energy production are also possible, in further embodiments, such as via a hydroelectric generator in the case of underwater repeaters, etc.

Figure 5:
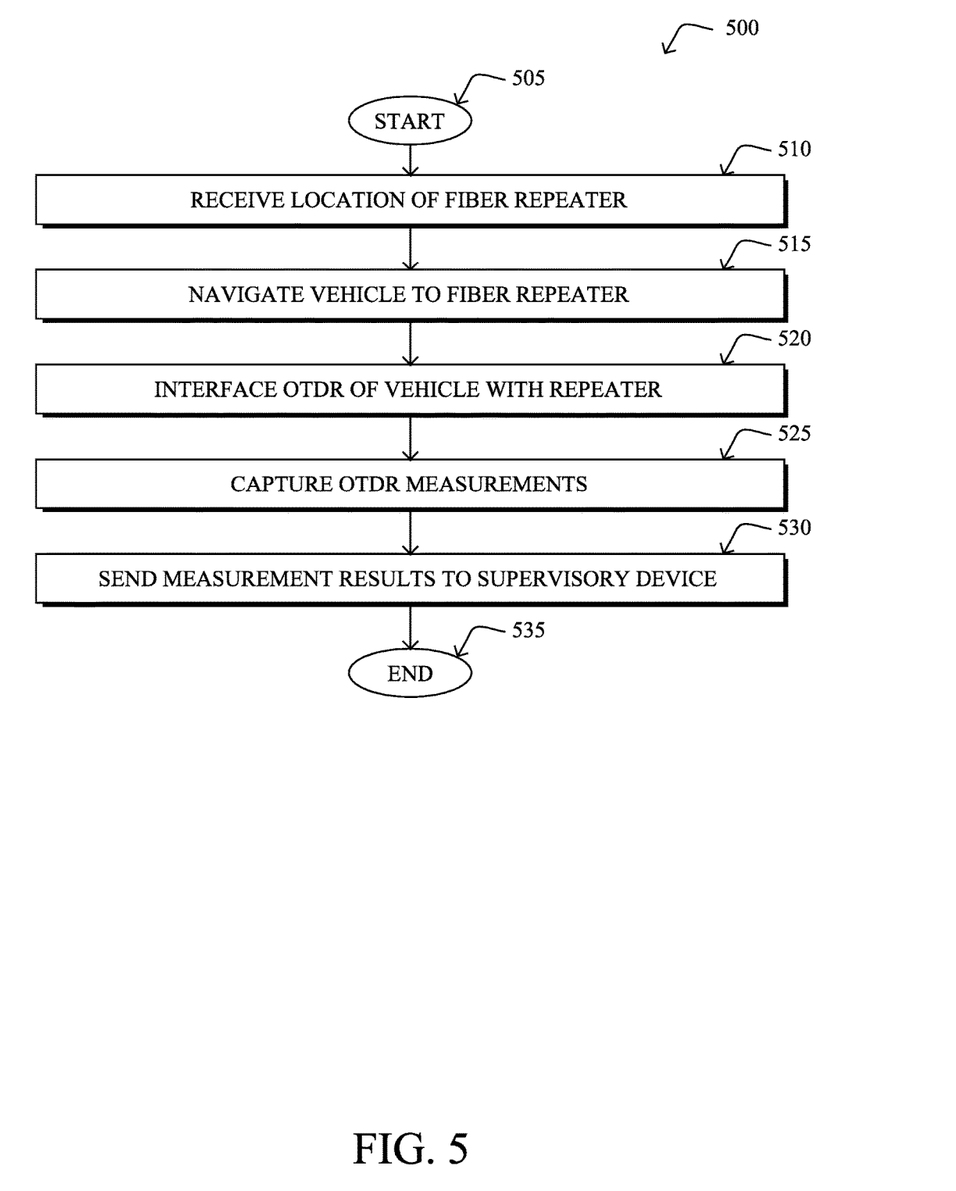
FIG. 5 illustrates a simplified procedure for assessing a fiber cable.

FIG. 5 illustrates an example simplified procedure for assessing a fiber cable in accordance with one or more embodiments described herein. For example, a non-generic, specifically configured device (e.g., device 200) may perform procedure 500 by executing stored instructions (e.g., fiber assessment process 248). Procedure 500 may start at step 505, and continues to step 510, where, as described in greater detail above, an autonomous vehicle may receive a location of a fiber optic cable repeater of a fiber optic cable. The location may be received from a supervisory device. The vehicle may be a UAV, UUV, a ground-based autonomous vehicle, or the like, depending on the location of the fiber cable and repeater. In various embodiments, the vehicle is equipped with an OTDR with which the vehicle can assess the fiber cable to determine the presence of any discontinuities, such as breaks in the fibers of the cable.

In step 515, the autonomous vehicle may navigate to the received location of the fiber optic cable repeater. As described in greater detail above, the vehicle may be deployed, such as from a perch of a supervisory device, to the location of the repeater. The vehicle may safely land on a landing pad of a vehicle interface positioned with the repeater.

In step 520, as described in greater detail above, the autonomous vehicle may interface an OTDR of the vehicle with the fiber optic cable repeater. In some embodiments, the vehicle OTDR may interface with an OTDR port of the fiber optic cable repeater by inserting a probe into a connector connecting fibers at the repeater.

In step 525, as described in more detail above, the autonomous vehicle may perform OTDR measuring and capture results of the measurements. For example, a signal may be sent by the vehicle OTDR from the fiber optic cable repeater OTDR ports along the fiber optic cable. Reflected and/or scattered return signals may be received at the vehicle from the port, which may be used to determine or confirm a potential cable break.

In step 530, as described in more detail above, the autonomous vehicle may send a result of the OTDR measuring of the fiber optic cable to a supervisory device. The result may be the measured return signal data or may be the determined location of the potential cable break, calculated by the vehicle from the return signal data. In some embodiments, the results may be communicated directly to the supervisory device. For example, the autonomous vehicle may navigate back to the supervisory device and upload the results. In some embodiments, the results may be provided wirelessly or by wired communication from the vehicle to the supervisory device. Procedure 500 then ends at step 535.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, include fiber cable assessments by autonomous vehicles, such as UAVs, UUVs, and the like, to monitor the quality and status of fiber optic cables. The vehicles may be equipped with an OTDR that can be used to find a potential discontinuity in the cable, such as a fiber break, which can be quite challenging for cables in remote or hard to reach locations, such as underground or underwater cables. The vehicles may further be equipped to indicate the location of the discontinuity, based on the results of OTDR measurements. The techniques herein may help to minimize the time to locate a break in a fiber optic cable and may ultimately lead to faster restoration of fiber optic cable service after a cable has been damaged.

While there have been shown and described illustrative embodiments that provide for the analysis and detection of breaks in a fiber cable using an autonomous vehicle, it is to be understood that various other adaptations and modifications may be made within the spirit and scope of the embodiments herein. For example, while certain embodiments are described herein with respect to locating potential breaks in a fiber optic cable, other discontinuities, such as regions of optical degradation, may also be determined and identified. In addition, the techniques may be repeated as needed in order to more precisely identify the location of the discontinuity.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   receiving, at an autonomous vehicle, a location of a fiber optic cable repeater of a fiber optic cable;
   navigating, by the autonomous vehicle, the vehicle to the location of the fiber optic cable repeater;
   interfacing, by the autonomous vehicle, an optical time domain reflectometer (OTDR) of the autonomous vehicle with an OTDR port of the fiber optic cable repeater;
   performing, by the autonomous vehicle, OTDR measuring of the fiber optic cable via the OTDR port of the fiber optic cable repeater; and
   sending, by the autonomous vehicle, a result of the OTDR measuring of the fiber optic cable to a supervisory device.

2. The method as in claim 1, wherein sending the result of the OTDR measuring of the fiber optic cable to the supervisory device comprises:
   navigating, by the autonomous vehicle, to the supervisory device; and
   uploading, by the autonomous vehicle, the result of the OTDR measuring of the fiber optic cable to the supervisory device.

3. The method as in claim 1, wherein sending the result of the OTDR measuring of the fiber optic cable to the supervisory device comprises:
   wirelessly communicating, by the autonomous vehicle, the result of the OTDR measuring of the fiber optic cable to the supervisory device.

4. The method as in claim 1, further comprising:
   determining, by the autonomous vehicle, whether a break exists in the fiber optic cable adjacent to the fiber optic cable repeater, wherein the result of the OTDR measuring of the fiber optic cable sent to the supervisory device includes an indication of the determined break.

5. The method as in claim 1, further comprising:
   receiving, at the autonomous vehicle, an indication of a location of a potential break along the fiber optic cable from the supervisory device, in response to result of the OTDR measuring sent to the supervisory device.

6. The method as in claim 1, further comprising:
   navigating, by the autonomous vehicle, the vehicle to a location of a potential break along the fiber optic cable; and
   generating, by the autonomous vehicle, an indication of the location of the potential break while the vehicle is near or at the location of the potential break.

7. The method as in claim 6, wherein the indication of the location of the potential break comprises a beam of light emitted by the autonomous vehicle towards the location of the potential break or a captured image of the location of the potential break.

8. The method as in claim 1, further comprising:
   receiving, at the autonomous vehicle, power from the fiber optic cable repeater.

9. The method as in claim 1, wherein the autonomous vehicle is an unmanned aerial vehicle (UAV) or an unmanned underwater vehicle (UUV).

10. An autonomous vehicle comprising:
    an optical time domain reflectometer (OTDR);
    a processor coupled to the OTDR and configured to execute a process; and
    a memory configured to store the process executable by the processor, the process when executed configured to:
    receive a location of a fiber optic cable repeater of a fiber optic cable;
    navigate the vehicle to the location of the fiber optic cable repeater;
    interfacing, by the autonomous vehicle, the OTDR with an OTDR port of the fiber optic cable repeater;
    perform OTDR measuring of the fiber optic cable via the OTDR port of the fiber optic cable repeater; and
    send a result of the OTDR measuring of the fiber optic cable to a supervisory device.

11. The autonomous vehicle as in claim 10, wherein the vehicle sends the result of the OTDR measuring of the fiber optic cable to the supervisory device by:
    navigating to the supervisory device; and
    uploading the result of the OTDR measuring of the fiber optic cable to the supervisory device.

12. The autonomous vehicle as in claim 10, wherein the vehicle sends the result of the OTDR measuring of the fiber optic cable to the supervisory device by:
    wirelessly communicating the result of the OTDR measuring of the fiber optic cable to the supervisory device.

13. The autonomous vehicle as in claim 10, wherein the process when executed is further configured to:
    determine whether a break exists in the fiber optic cable adjacent to the fiber optic cable repeater, wherein the result of the OTDR measuring of the fiber optic cable sent to the supervisory device includes an indication of the determined break.

14. The autonomous vehicle as in claim 10, wherein the process when executed is further configured to:
    receive an indication of a location of a potential break along the fiber optic cable from the supervisory device, in response to result of the OTDR measuring sent to the supervisory device.

15. The autonomous vehicle as in claim 10, wherein the process when executed is further configured to:
    navigate the vehicle to a location of a potential break along the fiber optic cable; and
    generate an indication of the location of the potential break.

16. The autonomous vehicle as in claim 15, wherein the indication of the location of the potential break comprises a beam of light emitted by the autonomous vehicle towards the location of the potential break or a captured image of the location of the potential break.

17. The autonomous vehicle as in claim 10, wherein the process when executed is further configured to:
    receive power from the fiber optic cable repeater.

18. The autonomous vehicle as in claim 10, wherein the autonomous vehicle is an unmanned aerial vehicle (UAV) or an unmanned underwater vehicle (UUV).

19. A tangible, non-transitory, computer-readable medium storing program instructions that, when executed by a processor of an autonomous vehicle, causes the processor to perform a process comprising:
    receiving, at the autonomous vehicle, a location of a fiber optic cable repeater of a fiber optic cable;
    navigating, by the autonomous vehicle, the vehicle to the location of the fiber optic cable repeater;

interfacing, by the autonomous vehicle, an optical time domain reflectometer (OTDR) of the autonomous vehicle with an OTDR port of the fiber optic cable repeater;
performing, by the autonomous vehicle, OTDR measuring of the fiber optic cable via the OTDR port of the fiber optic cable repeater; and
sending, by the autonomous vehicle, a result of the OTDR measuring of the fiber optic cable to a supervisory device.

20. The tangible, non-transitory, computer-readable medium as in claim 19, wherein the autonomous vehicle is an unmanned aerial vehicle (UAV) or an unmanned underwater vehicle (UUV).

\* \* \* \* \*